United States Patent [19]

Aiba et al.

[11] Patent Number: 4,599,624

[45] Date of Patent: Jul. 8, 1986

[54] ATMOSPHERIC PRESSURE CHAMBER IN AN INK JET SYSTEM PRINTER

[75] Inventors: Masahiko Aiba, Nara; Masaaki Kuranishi, Yamatokoriyama; Hideyuki Miyake, Nara, all of Japan

[73] Assignee: Sharp Kabushiki Kaisha, Osaka, Japan

[21] Appl. No.: 571,670

[22] Filed: Jan. 17, 1984

[30] Foreign Application Priority Data

Jan. 18, 1983 [JP] Japan .............................. 58-6171[U]

[51] Int. Cl.⁴ .............................................. G01D 15/18

[52] U.S. Cl. .................................. 346/75; 346/140 R

[58] Field of Search .................................. 346/75, 140

[56] References Cited

U.S. PATENT DOCUMENTS

| | | | |
|---|---|---|---|
| 3,761,953 | 9/1973 | Helgeson | 346/75 |
| 3,835,881 | 9/1974 | Dal | 346/140 X |
| 4,124,853 | 11/1978 | Kattner | 346/140 |
| 4,270,133 | 5/1981 | Shimazawa | 346/75 X |
| 4,422,085 | 12/1983 | Sumitomo | 346/75 X |
| 4,475,116 | 10/1984 | Sicking | 346/140 |

OTHER PUBLICATIONS

Greene, J.; Pressure Surge Accumulator, IBM TDB, vol. 15, No. 3, Aug. 1972, p. 766.

*Primary Examiner*—Joseph W. Hartary
*Attorney, Agent, or Firm*—Birch, Stewart, Kolasch & Birch

[57] ABSTRACT

An ink liquid supply system for an ink jet system printer includes an atmospheric pressure chamber interposed between an ink tank and a pressurizing pump. An air buffer is immersed in an ink liquid contained in the atmospheric pressure chamber. The air buffer is surrounded by a resilient wall and the inside of the air buffer is communicated with the atmosphere through an air inlet. When the ink liquid contained in the atmospheric pressure chamber freezes, the expansion of the ink liquid is absorbed by the air buffer, thereby preventing the explosion of the atmospheric pressure chamber.

3 Claims, 2 Drawing Figures

ATMOSPHERIC PRESSURE CHAMBER IN AN INK JET SYSTEM PRINTER

BACKGROUND AND SUMMARY OF THE INVENTION

The present invention relates to an ink liquid supply system in an ink jet system printer of the charge amplitude controlling type.

Generally, the ink jet system printer of the charge amplitude controlling type uses water-color ink. Therefore, if the ambient temperature drops below −5° C. while the ink jet system printer is not used or while the ink jet system printer is transported from an office to another one, the water-color ink may freeze. The freezing of the water-color ink provides the expansion of the water-color ink disposed in the ink liquid supply system to explode the ink liquid supply system.

To prevent freezing of the water-color ink, in the conventional system, antifreezing fluid is mixed with the pressurized water-color ink in, for example, a pressurizing pump. However, any effective methods have not been found to prevent the freezing of the atmospheric pressure water-color ink.

Accordingly, an object of the present invention is to provide an ink liquid supply system in an ink jet system printer of the charge amplitude controlling type, which prevents the explosion of the ink liquid supply system even when the water-color ink at atmospheric pressure freezes.

Another object of the present invention is to provide a novel atmospheric pressure chamber disposed in an ink liquid supply system of an ink jet system printer, which ensures stable operation of the ink jet system printer.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, an atmospheric pressure chamber is disposed between an ink tank and a pressurizing pump. An air buffer surrounded by a resilient wall and communicating with the atmosphere is disposed in the atmospheric pressure chamber so at to contact the water-color ink at atmospheric pressure filled in the atmospheric pressure chamber. When the water-color ink at atmospheric pressure freezes, the expansion of the ink liquid is absorbed by the air buffer, whereby the explosion of the ink liquid supply system is prevented.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
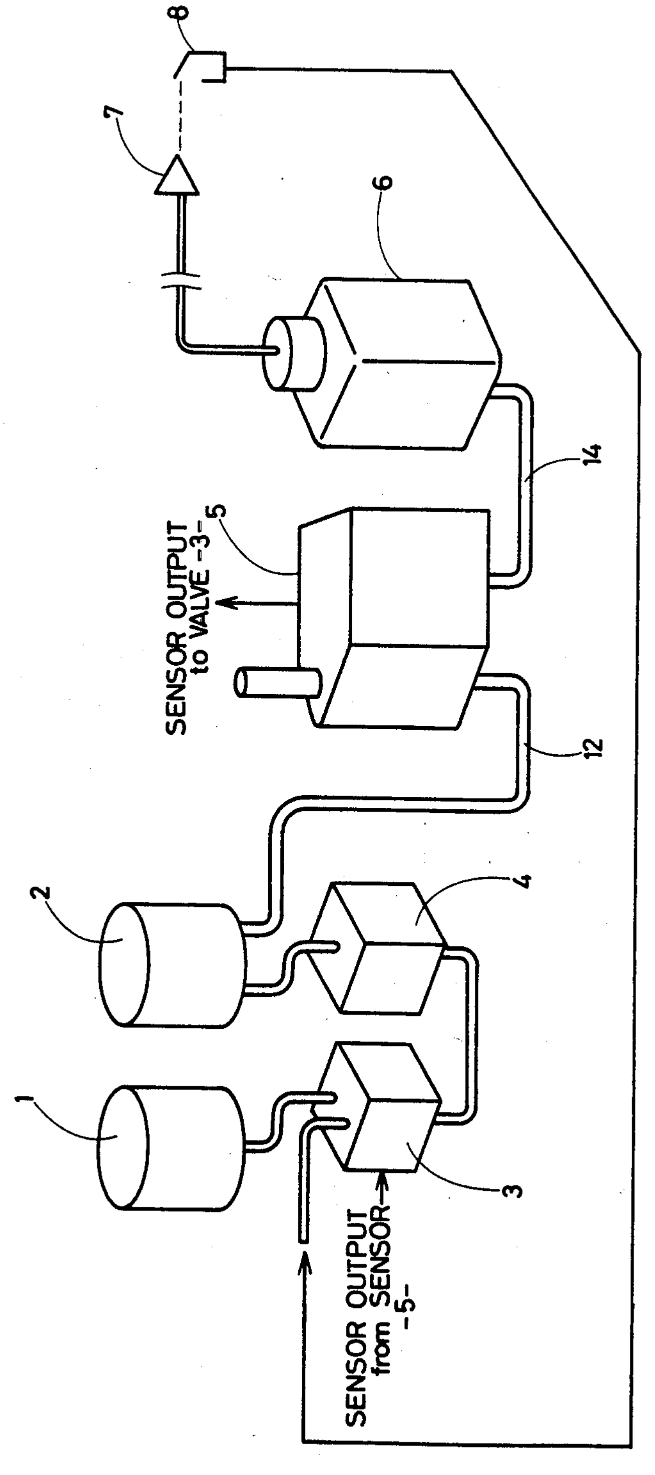
FIG. 1 is a schematic block diagram of an embodiment of an ink liquid supply system of the present invention.

An ink liquid supply system of the present invention includes a dilution tank 1 and an tank 2. The dilution tank 1 contains the dilution, for example, water in order to maintain the concentration of the water-color ink at a desired level. The dilution tank 1 and the ink tank 2 can be of the cartridge type. An electromagnetic cross valve 3 is connected to the dilution tank 1 to selectively supply the dilution to the ink tank 2. More specifically, the electromagnetic cross valve 3 has two inlets, one being connected to the dilution tank 1, and the other being connected to a beam gutter 8 which collects the ink liquid emitted from a nozzle 7 but not contributed to the actual printing operation. An outlet of the electromagnetic cross valve 3 is connected to the ink tank 2 via a suction pump 4.

The ink liquid developed from the ink tank 2 is applied to an atmospheric pressure chamber/ink viscosity sensor unit 5. A pressurizing pump 6 is connected to the atmospheric pressure chamber/ink viscosity sensor unit 5 in order to supply pressurized ink liquid to the nozzle 7. The atmospheric pressure chamber/ink viscosity sensor unit 5 develops a sensor output when the concentration of the ink liquid is higher than a predetermined level. The thus obtained sensor output is applied to the electromagnetic cross valve 3 in order to control the operation of the electromagnetic cross valve 3. That is, in the normal operational mode, the electromagnetic cross valve 3 is placed in a condition wherein the ink liquid collected by the beam gutter 8 is applied to the suction pump 4. When the sensor output is developed from the atmospheric pressure chamber/ink viscosity sensor unit 5, the electromagnetic cross valve 3 is operated to supply the dilution contained in the dilution tank 1 to the ink tank 2 via the suction pump 4.

The ink tank 2 is provided with an opening through which the ink tank 2 communicates with the atmosphere, whereby the air bubbles included in the ink liquid are removed. Therefore, the ink liquid is held at the atmospheric pressure before it is applied to the pressurizing pump 6.

Figure 2:
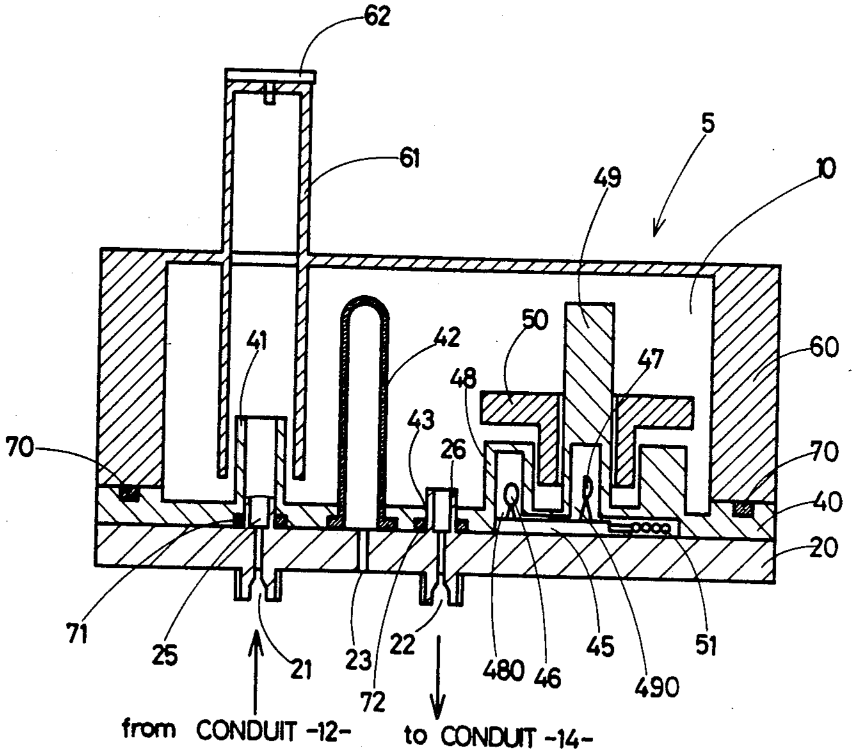
FIG. 2 is a sectional view of an atmospheric pressure chamber/ink viscosity sensor unit included in the ink liquid supply system of FIG. 1.

FIG. 2 shows the atmospheric pressure chamber/ink viscosity sensor unit 5 which includes a bottom base 20, a transparent or translucent intermediate base 40, and a cover 60, which, in combination, defines an ink chamber 10. The bottom base 20 is provided with an inlet 21 which is connected to the ink tank 2 via a conduit 12, an outlet 22 which is connected to the pressurizing pump 6 via another conduit 14, and an air inlet 23. The inlet 21 and the outlet 22 include a threaded portion for facilitating the connection between the conduits 12 and 14 via a joint, respectively.

The intermediate base 40 includes a cylinder 41 which is engaged to a cylinder 25 formed on the bottom base 20 at the position where the inlet 21 is formed. The cylinder 41 is accommodated in an air trap 61 which is integral with the cover 60. The air trap 61 is covered by a screw 62 which is unfastened at a desired time to dischage the air from the ink chamber 10. A cylinder 26 is formed on the bottom base 20 at the position where the outlet 22 is formed. The intermediate base 40 is provided with an opening 43 which is formed at the position corresponding to the cylinder 26.

An air buffer 42 is secured to the bottom base 20 and supported by the intermediate base 40 at the position where the air inlet 23 is formed. The air buffer 42 is made of an elastic material such as rubber, and preferably "EPDM". The air buffer 42 has a volume about 10% of that of the ink chamber 10.

A cylinder 49, and a circular shaped projection 48 are integrally formed on the intermediate base 40. The cylinder 49 includes a hollow portion 490 wherein a light responsive element 47 is disposed and supported by a table 45. The circular shaped projection 48 includes a hollow portion 480 wherein a light emitting element 46 is disposed and supported by the table 45. A signal wire 51 is connected to the table 45. A circular shaped float 50 is slidably disposed around the cylinder 49. The circular shaped float 50 is made of a polymer film, for example, a polyester film (specific gravity is 1.68) so that the circular shaped float 50 moves upward along the cylinder 49 when the concentration of the ink liquid becomes higher than a predetermined level. When the circular shaped float 50 is located at an upper position, the light responsive element 47 receives the light emitted from the light emitting element 46 so as to develop the sensor output on the signal wire 51. Sealing rubbers 70, 71 and 72 are provided to prevent the leakage of the ink liquid from the atmospheric pressure chamber/ink viscosity sensor unit 5.

Under the condition where the water-color ink is filled in the ink chamber 10, when the water-color ink freezes, the expansion of the ink liquid is absorbed by the air buffer 42 so as to prevent the explosion of the atmospheric pressure chamber/ink viscosity sensor unit 5.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An ink liquid supply system for an ink jet system printer of the charge amplitude controlling type comprising:

an ink tank containing a water-color ink therein;

a dilution tank containing a diluting liquid therein;

pressurizing pump means for receiving said water-color ink from said ink tank via said atmospheric pressure chamber and for developing pressurized ink;

a nozzle unit connected to said pressurizing pump means for receiving said pressurized ink and developing ink droplets therefrom;

beam gutter means for collecting ink droplets not contributing to the actual printing operation;

valve means for selectively connecting said ink tank to said dilution tank or said beam gutter means; and an atmospheric pressure chamber interposed between said ink tank and said pressurizing pump means via two respective conduits, said atmospheric pressure chamber including an ink chamber containing ink at atmospheric pressure therein supplied from said ink tank;

an air buffer immersed in said ink at atmospheric pressure contained in said ink chamber, said air buffer having a resilient tubular wall with an opening at only one end thereof defining an air chamber therein wherein said air buffer absorbs expansion of said ink liquid in said atmospheric pressure chamber by expelling said air at atmospheric pressure to the exterior of said chamber; and air inlet means disposed in a base layer of said atmospheric pressure chamber for communicating said air chamber with the atmosphere at said open end thereof.

2. The ink liquid supply system of claim 1, said atmospheric pressure chamber further including:

an ink viscosity sensor unit immersed in said ink at atmospheric pressure contained in said ink chamber for developing a sensor output when the concentration of said ink at atmospheric pressure is higher than a preselected level.

3. The ink liquid supply system of claim 2, wherein said valve means is normally placed in a first position wherein said beam gutter is connected to said ink tank, and is placed in a second position, in response to said sensor output developed from said ink viscosity sensor unit, wherein said dilution tank is connected to said ink tank.

* * * * *